(12) United States Patent
Hayashi

(10) Patent No.: US 11,685,821 B2
(45) Date of Patent: Jun. 27, 2023

(54) RUBBER COMPOSITION FOR A TIRE TREAD

(71) Applicant: COMPAGNIE GENERALE DES ETABLISSEMENTS MICHELIN, Clermont-Ferrand (FR)

(72) Inventor: Tenko Hayashi, Tokyo (JP)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 364 days.

(21) Appl. No.: 17/252,650

(22) PCT Filed: Jun. 15, 2018

(86) PCT No.: PCT/JP2018/022830
§ 371 (c)(1),
(2) Date: Dec. 15, 2020

(87) PCT Pub. No.: WO2019/239568
PCT Pub. Date: Dec. 19, 2019

(65) Prior Publication Data
US 2021/0253833 A1 Aug. 19, 2021

(51) Int. Cl.
*C08L 9/00* (2006.01)
*B60C 1/00* (2006.01)

(52) U.S. Cl.
CPC .............. *C08L 9/00* (2013.01); *B60C 1/0016* (2013.01); *C08L 2205/035* (2013.01); *C08L 2207/20* (2013.01)

(58) Field of Classification Search
CPC .................................... C08L 9/00; B60C 1/00
USPC ........................................................ 524/526
See application file for complete search history.

(56) References Cited

U.S. PATENT DOCUMENTS

| | | | |
|---|---|---|---|
| 6,028,137 A | 2/2000 | Mahmud et al. |
| 6,414,061 B1 | 7/2002 | Cruse et al. |
| 6,774,255 B1 | 8/2004 | Tardivat et al. |
| 6,849,754 B2 | 2/2005 | Deschler et al. |
| 7,217,751 B2 | 5/2007 | Durel et al. |
| 2004/0051210 A1 | 3/2004 | Tardivat et al. |
| 2004/0129360 A1 | 7/2004 | Vidal |
| 2005/0004297 A1 | 1/2005 | Durel et al. |
| 2005/0016650 A1 | 1/2005 | Durel et al. |
| 2005/0016651 A1 | 1/2005 | Durel et al. |
| 2005/0245753 A1 | 11/2005 | Cruse et al. |
| 2007/0228322 A1 | 10/2007 | Chaves et al. |
| 2009/0186961 A1 | 7/2009 | Araujo Da Silva et al. |
| 2009/0209709 A1 | 8/2009 | Araujo Da Silva et al. |
| 2009/0234066 A1 | 9/2009 | Araujo Da Silva et al. |
| 2010/0145089 A1 | 6/2010 | Mignani et al. |
| 2011/0294953 A1 | 12/2011 | Seeboth et al. |

FOREIGN PATENT DOCUMENTS

| | | | |
|---|---|---|---|
| JP | 1-289704 A | 11/1989 |
| JP | 2001-89601 A | 4/2001 |
| JP | 2007-126518 A | 5/2007 |
| JP | 2011-12248 A | 1/2011 |
| WO | 96/37547 A2 | 11/1996 |
| WO | 99/09036 A1 | 2/1999 |
| WO | 99/28380 A1 | 6/1999 |
| WO | 02/30939 A1 | 4/2002 |
| WO | 02/31041 A1 | 4/2002 |
| WO | 02/083782 A1 | 10/2002 |
| WO | 03/002648 A1 | 1/2003 |
| WO | 03/002649 A1 | 1/2003 |
| WO | 03/016387 A1 | 2/2003 |
| WO | 2004/033548 A1 | 4/2004 |
| WO | 2006/023815 A2 | 3/2006 |
| WO | 2006/125532 A1 | 11/2006 |
| WO | 2006/125533 A1 | 11/2006 |
| WO | 2006/125534 A1 | 11/2006 |
| WO | 2007/098080 A2 | 8/2007 |
| WO | 2008/055986 A2 | 5/2008 |
| WO | 2010/072685 A1 | 7/2010 |
| WO | 2015/016388 A1 | 2/2015 |
| WO | 2017/104781 A1 | 6/2017 |
| WO | WO-2017213204 A1 * | 12/2017 | ........... B60C 1/0016 |

OTHER PUBLICATIONS

International Search Report dated Sep. 6, 2018, in corresponding PCT/JP2018/022830 (1 page).

* cited by examiner

*Primary Examiner* — Deve V Hall
(74) *Attorney, Agent, or Firm* — Venable LLP

(57) ABSTRACT

A tire has a tread comprising a rubber composition based on at least an elastomer matrix, a reinforcing filler comprising between 65 and 115 phr of a reinforcing inorganic filler, more than 30 phr of a plasticizing agent, and more than 5 phr of crumb rubber particles having a median particle size by volume, which is measured by laser diffraction methods in accordance with ISO standard 13320-1, which satisfy the following relations: 100 μm<$D_{50}$<1000 μm, wherein $D_{50}$ is the medium particle size by volume corresponding to 50% of a cumulative distribution obtained from the volume particle size distribution.

20 Claims, No Drawings

RUBBER COMPOSITION FOR A TIRE TREAD

TECHNICAL FIELD

The field of the invention is that of rubber compositions for tire treads, more precisely rubber compositions for tire treads suitable for snow tires or winter tires capable of rolling over ground surfaces covered with snow, ice or the mixtures thereof.

BACKGROUND ART

As is known, the snow tires classified in a category of use "snow", identified by an inscription the alpine symbol ("3-peak-mountain with snowflake"), marked on their sidewalls, mean tires whose tread patterns, tread compounds and/or structures are primarily designed to achieve, in snow conditions, a performance better than that of normal tires intended for normal on-road use with regard to their abilities to initiate, maintain or stop vehicle motion.

Winter roads (snowy road and icy road) have a feature of having a low friction coefficient and a constant objective of tire manufacturers is improvement of a grip performance of tires on snow-covered (snowy) ground and icy ground.

CITATION LIST

Patent Literature

PTL 1: WO 2015/016388

The patent literature 1 discloses a tire tread that comprises a rubber composition comprising milliparticles, said tire having winter grips (snow grip and ice grip) improved by the milliparticles and millicavities released by the milliparticles after gradual expulsion from the rubber matrix.

However, when the millicavities appear in the tire tread surface, there is concern that the users have an impression that the tire tread surface gets damaged, not usual tire wear.

SUMMARY OF INVENTION

Technical Problem

During their research, the inventor has discovered a specific rubber composition which allows an unexpectedly improved totality of the performances of snow grip and ice grip and the appearance of tire tread surface during the service life of the tire.

In the present description, unless expressly stated otherwise, all the percentages (%) indicated are percentages by weight (wt %).

The expression "elastomer matrix" is understood to mean, in a given composition, all of the elastomers present in said rubber composition.

The abbreviation "phr" signifies parts by weight per hundred parts by weight of the elastomer matrix in the considered rubber composition.

In the present description, unless expressly indicated otherwise, each $Tg_{DSC}$ (glass transition temperature) is measured in a known way by DSC (Differential Scanning Calorimetry) according to Standard ASTM D3418-08.

Any interval of values denoted by the expression "between a and b" represents the range of values of greater than "a" and of less than "b" (i.e. the limits a and b excluded) whereas any interval of values denoted by the expression "from a to b" means the range of values going from "a" to "b" (i.e. including the strict limits a and b).

The expression "based on" should be understood in the present application to mean a composition comprising the mixture(s) and/or the product of the reaction of the various constituents used, some of the constituents being able or intended to react together, at least partly, during the various manufacturing phases of the composition, in particular during the vulcanization (curing).

Solution to Problem

A first aspect of the invention is a tire having a tread comprising a rubber composition based on at least an elastomer matrix, a reinforcing filler comprising between 65 and 115 phr of a reinforcing inorganic filler, more than 30 phr (for example, between 30 and 120 phr), preferably more than 35 phr (for example, between 35 and 115 phr), of a plasticizing agent, and more than 5 phr (for example, between 5 and 150 phr), preferably more than 10 phr (for example, between 10 and 100 phr), more preferably more than 15 phr (for example, between 15 and 50 phr), of crumb rubber particles having a median particle size by volume, which is measured by laser diffraction methods in accordance with ISO standard 13320-1, which satisfy the following relations 100 µm<$D_{50}$<1000 µm, preferably 200 µm<$D_{50}$<900 µm, more preferably 300 µm<$D_{50}$<800 µm, still more preferably 400 µm<$D_{50}$<700 µm, wherein $D_{50}$ is the medium particle size by volume corresponding to 50% of a cumulative distribution obtained from the volume particle size distribution.

The tread of the tire according to the invention is intended to come into contact with the ground during the service life of the tire.

The service life of the tire means the duration to use the tire (for example, the term from the new state to the final state of the tire, the final state means a state on reaching the wear indicator bar(s) in the tread of tire).

Advantageous Effects of Invention

The specific rubber composition of the tread of the tire according to the invention allows an unexpectedly improved totality among the performances of grips on winter roads (snowy road and icy road) and the appearance of tire tread surface during the service life of the tire.

DESCRIPTION OF EMBODIMENTS

The tires of the invention are particularly intended to equip passenger motor vehicles, including 4×4 (four-wheel drive) vehicles and SUV (Sport Utility Vehicles) vehicles, and industrial vehicles particularly selected from vans and heavy duty vehicles (i.e., bus or heavy road transport vehicles (lorries, tractors, trailers)).

Each of the below aspect(s), the embodiment(s) and the variant(s) including each of the preferred range(s) and/or matter(s) may be applied to any one of the other aspect(s), the other embodiment(s) and the other variant(s) of the invention unless expressly stated otherwise.

The rubber composition of the tread of the tire according to the invention is based on an elastomer matrix.

Elastomer (or loosely "rubber", the two terms being regarded as synonyms) of the "diene" type is to be understood in a known manner as an (meaning one or more) elastomer derived at least partly (i.e. a homopolymer or a copolymer) from diene monomers (monomers bearing two carbon-carbon double bonds, conjugated or not).

These diene elastomers can be classified into two categories: "essentially unsaturated" or "essentially saturated". Generally, the expression "essentially unsaturated" is understood to mean a diene elastomer resulting at least in part from conjugated diene monomers having a content of units of diene origin (conjugated dienes) which is greater than 15% (mol %); thus it is that diene elastomers such as butyl rubbers or diene/α-olefin copolymers of the EPDM type do not fall under the preceding definition and may especially be described as "essentially saturated" diene elastomers (low or very low content of units of diene origin, always less than 15%). In the category of "essentially unsaturated" diene elastomers, the expression "highly unsaturated" diene elastomer is understood to mean in particular a diene elastomer having a content of units of diene origin (conjugated dienes) which is greater than 50%.

Although it applies to any type of diene elastomer, a person skilled in the art of tires will understand that the invention is preferably employed with essentially unsaturated diene elastomers.

Given these definitions, the expression diene elastomer capable of being used in the compositions in accordance with the invention is understood in particular to mean:

(a)—any homopolymer obtained by polymerization of a conjugated diene monomer, preferably having from 4 to 12 carbon atoms;

(b)—any copolymer obtained by copolymerization of one or more conjugated dienes with one another or with one or more vinyl aromatic compounds preferably having from 8 to 20 carbon atoms.

The following are suitable in particular as conjugated dienes: 1,3-butadiene, 2-methyl-1,3-butadiene, 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene, 1,3-pentadiene or 2,4-hexadiene. The following, for example, are suitable as vinylaromatic compounds: styrene, ortho-, meta- or para-methylstyrene, the"vinyltoluene" commercial mixture, para-(tert-butyl) styrene, methoxy styrenes, chlorostyrenes, vinylmesitylene, divinylbenzene or vinylnaphthalene.

A second aspect of the invention is the tire according to the first aspect, wherein the elastomer matrix comprises at least a diene elastomer selected from the group consisting of polybutadienes (BR), polyisoprenes, butadiene copolymers, isoprene copolymers, and the mixtures thereof.

A third aspect of the invention is the tire according to the second aspect, wherein the elastomer matrix comprises a first diene elastomer which is a polybutadiene and a second diene elastomer which is a polyisoprene.

According to a preferred embodiment of the third aspect, the first diene elastomer may be a polybutadiene(s) having a content (molar %) of 1,2-units of between 4% and 80% or those having a content (molar %) of cis-1,4-units of greater than 80%, preferably greater than 90% (molar %), more preferably greater than or equal to 96% (molar %).

According to a preferred embodiment of the third aspect, the second diene elastomer may be a polyisoprene(s) selected from the group consisting of synthetic polyisoprenes (IRs), natural rubber (NR) and the mixtures thereof. The synthetic polyisoprene(s) may be synthetic cis-1,4-polyisoprene(s), preferably having a content (mol %) of cis-1,4-units of greater than 90%, more preferably of greater than 98%.

A fourth aspect of the invention is the tire according to the third aspect, wherein the second diene elastomer predominately comprises natural rubber, that is, the second diene elastomer comprises more than 50% by weight of natural rubber per 100% by weight of the second diene elastomer.

A fifth aspect of the invention is the tire according to the fourth aspect, wherein the second diene elastomer is natural rubber.

A sixth aspect of the invention is the tire according to any one of the third to the fifth aspects, wherein the content of the first diene elastomer is 25 to 75 phr, preferably 30 to 70 phr, more preferably 35 to 70 phr, still more preferably 40 to 70 phr, particularly 45 to 70 phr, more particularly 50 to 70 phr, and the content of the second diene elastomer is 25 to 75 phr, preferably 30 to 70 phr, more preferably 30 to 65 phr, still more preferably 30 to 60 phr, particularly 30 to 55 phr, more particularly 30 to 50 phr.

A seventh aspect of the invention is the tire according to any one of the third to the sixth aspects, wherein the total content of the first diene elastomer and the second elastomer is more than 90 phr, preferably more than 95 phr.

An eighth aspect of the invention is the tire according to the seventh aspect, wherein the total content of the first diene elastomer and the second elastomer is 100 phr.

The rubber composition of the tread of the tire according to the invention is based on a reinforcing filler.

The reinforcing filler may comprise a reinforcing inorganic filler (for instance, silica), a reinforcing organic filler (for example, carbon black), or the mixtures thereof.

The expression "reinforcing inorganic filler" should be understood here to mean any inorganic or mineral filler, whatever its color and its origin (natural or synthetic), also referred to as "white filler", "clear filler" or even "non-black filler", in contrast to carbon black, capable of reinforcing by itself alone, without means other than an intermediate coupling agent, a rubber composition intended for the manufacture of tires, in other words capable of replacing, in its reinforcing role, a conventional tire-grade carbon black; such a filler is generally characterized, in a known manner, by the presence of hydroxyl (—OH) groups at its surface.

The physical state under the presence of this filler is unimportant, whether it is in the form of powder, microbeads, granules, beads or any other suitable densified form. Of course, the reinforcing inorganic filler of the mixtures of various reinforcing inorganic fillers, preferably of highly dispersible siliceous and/or aluminous fillers is described hereafter.

Mineral fillers of the siliceous type, preferably silica ($SiO_2$) and/or the aluminous type, preferably alumina ($Al_2O_3$) are suitable in particular as the reinforcing inorganic fillers.

The reinforcing filler in the rubber composition of the tread of the tire according to the invention comprises between 65 and 115 phr of a reinforcing inorganic filler.

A ninth aspect of the invention is the tire according to any one of the first to the eighth aspects, wherein the reinforcing filler comprises between 70 and 110 phr, preferably 75 to 105 phr, of a reinforcing inorganic filler.

A tenth aspect of the invention is the tire according to any one of the first to the ninth aspects, wherein the reinforcing inorganic filler predominately comprises silica, that is, the reinforcing inorganic filler comprises more than 50% by weight of silica per 100% by weight of the reinforcing inorganic filler.

An eleventh aspect of the invention is the tire according to the tenth aspect, wherein, the reinforcing inorganic filler is silica.

The reinforcing inorganic filler of the reinforcing filler in the rubber composition may be based on a type of silica or a blend of several silicas. The silica used may be any reinforcing silica known to a person skilled in the art, in particular any precipitated or pyrogenic silica having a BET surface area and a CTAB specific surface area that are both less than 450 m$^2$/g, preferably from 20 to 400 m$^2$/g. Such silica may be covered or not. Mention will be made, as low specific surface silica, of Sidistar R300 from Elkem Silicon Materials. Mention will be made, as highly dispersible precipitated silicas ("HDSs"), for example, of "Ultrasil 7000" and "Ultrasil 7005" from Evonik, "Zeosil 1165 MP", "Zeosil 1135 MP" and "Zeosil 1115 MP" from Rhodia, "Hi-Sil EZ150G" from PPG, "Zeopol 8715", "Zeopol 8745" and "Zeopol 8755" from Huber or the silicas with a high specific surface area as described in a patent application WO 03/016387. Mention will be made, as pyrogenic silicas, for example, of "CAB-O-SIL S-17D" from Cabot, "HDK T40" from Wacker, "Aeroperl 300/30", "Aerosil 380", "Aerosil 150" or "Aerosil 90" from Evonik. Such silica may be covered, for example, "CAB-O-SIL TS-530" covered with hexamethyldisilazene or "CAB-O-SIL TS-622" covered with dimethyldichlorosilane from Cabot.

A person skilled in the art will understand that a reinforcing filler of another nature, in particular organic nature, such as carbon black, might be used as filler equivalent to the reinforcing inorganic filler described in the present section, provided that this reinforcing filler is covered with an inorganic layer, such as silica, or else comprises, at its surface, functional sites, in particular hydroxyls, requiring the use of a coupling agent in order to form the connection between the filler and the elastomer. By way of example, mention may be made of carbon blacks for tires, such as described in patent applications WO 96/37547 and WO 99/28380.

A twelfth aspect of the invention is the tire according to any one of the first to the eleventh aspects, wherein the reinforcing filler further comprises less than 20 phr (for example, between 0 and 20 phr), preferably less than 15 phr (for example, between 1 and 15 phr), more preferably less than 10 phr (for example, between 2 and 10 phr), of carbon black.

Within the ranges indicated, there is a benefit of coloring properties (black pigmentation agent) and anti-UV properties of carbon blacks, without furthermore adversely affecting the typical performance provided by the reinforcing inorganic filler, namely low hysteresis (reduced rolling resistance).

According to one preferred embodiment of the invention, the total content of reinforcing filler may be 70 to 130 phr, preferably 75 to 125 phr.

In order to couple the reinforcing inorganic filler to the elastomer matrix, for instance, the diene elastomer, use can be made, in a known manner, of a coupling agent (or bonding agent) intended to provide a satisfactory connection, of chemical and/or physical nature, between the reinforcing inorganic filler (surface of its particles) and the elastomer matrix, for instance, the diene elastomer. This coupling agent is at least bifunctional. Use can be made in particular of at least bifunctional organosilanes or polyorganosiloxanes.

Use can be made in particular of silane polysulphides, referred to as "symmetrical" or "asymmetrical" depending on their particular structure, as described, for example, in applications WO 03/002648, WO 03/002649 and WO 2004/033548.

Particularly suitable silane polysulphides correspond to the following general formula (I):

Z-A-Sx-A-Z    (I), in which:

x is an integer from 2 to 8 (preferably from 2 to 5);
A is a divalent hydrocarbon radical (preferably, $C_1$-$C_{18}$ alkylene groups or $C_6$-$C_{12}$ arylene groups, more particularly $C_1$-$C_{10}$, in particular $C_1$-$C_4$, alkylenes, especially propylene);
Z corresponds to one of the formulae below:

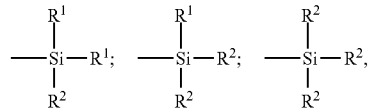

[Chem. 1]

in which:
the $R^1$ radicals which are unsubstituted or substituted and identical to or different from one another, represent a $C_1$-$C_{18}$ alkyl, $C_5$-$C_{18}$ cycloalkyl or $C_6$-$C_{18}$ aryl group (preferably, $C_1$-$C_6$ alkyl, cyclohexyl or phenyl groups, in particular $C_1$-$C_4$ alkyl groups, more particularly methyl and/or ethyl),
the $R^2$ radicals which are unsubstituted or substituted and identical to or different from one another, represent a $C_1$-$C_{18}$ alkoxyl or $C_5$-$C_{18}$ cycloalkoxyl group (preferably a group selected from $C_1$-$C_8$ alkoxyls and $C_5$-$C_8$ cycloalkoxyls, more preferably a group selected from $C_1$-$C_4$ alkoxyls, in particular methoxyl and ethoxyl), are suitable in particular, without limitation of the above definition.

In the case of a mixture of alkoxysilane polysulphides corresponding to the above formula (I), in particular normal commercially available mixtures, the mean value of the "x" indices is a fractional number preferably of between 2 and 5, more preferably of approximately 4. However, the present invention can also advantageously be carried out, for example, with alkoxysilane disulphides (x=2).

Mention will more particularly be made, as examples of silane polysulphides, of bis(($C_1$-$C_4$)alkoxyl($C_1$-$C_4$)alkylsilyl($C_1$-$C_4$)alkyl)polysulphides (in particular disulphides, trisulphides or tetrasulphides), such as, for example, bis(3-trimethoxysilylpropyl) or bis(3-triethoxysilylpropyl)polysulphides. Use is in particular made, among these compounds, of bis(3-triethoxysilylpropyl)tetrasulphide, abbreviated to TESPT, of formula [($C_2H_5O$)$_3$Si($CH_2$)$_3S_2$]$_2$, or bis(3-triethoxysilylpropyl)disulphide, abbreviated to TESPD, of formula [($C_2HSO$)$_3$Si($CH_2$)$_3S$]$_2$. Mention will also be made, as preferred examples, of bis(mono($C_1$-$C_4$) alkoxyldi($C_1$-$C_4$)alkylsilylpropyl)polysulphides (in particular disulphides, trisulphides or tetrasulphides), more particularly bis(monoethoxydimethylsilylpropyl)tetrasulphide, as described in patent application WO 02/083782 (or U.S. Pat. No. 7,217,751).

Mention will in particular be made, as coupling agent other than alkoxysilane polysulphide, of bifunctional POSs (polyorganosiloxanes) or of hydroxysilane polysulphides ($R^2$=OH in the above formula (I)), such as described in patent applications WO 02/30939 (or U.S. Pat. No. 6,774,255) and WO 02/31041 (or US 2004/051210), or of silanes or POSs carrying azodicarbonyl functional groups, such as described, for example, in patent applications WO 2006/125532, WO 2006/125533 and WO 2006/125534.

As examples of other silane sulphides, mention will be made, for example, of the silanes bearing at least one thiol (—SH) function (referred to as mercaptosilanes) and/or at least one blocked thiol function, such as described, for example, in patents or patent applications U.S. Pat. No. 6,849,754, WO 99/09036, WO 2006/023815, WO 2007/098080, WO 2008/055986 and WO 2010/072685.

Of course, use could also be made of mixtures of the coupling agents described previously, as described in particular in the aforementioned patent application WO 2006/125534.

According to one preferred embodiment of the invention, the content of coupling agent may be preferably from 0.5 to 15% by weight per 100% by weight of the reinforcing inorganic filler, particularly silica.

According to one preferred embodiment of the invention, the rubber composition of the tire according to the invention may be based on less than 15 phr (for example, between 0.1 and 15 phr) of coupling agent.

The rubber composition of the tread of the tire according to the invention is based on a plasticizing agent.

The role of the plasticizing agent is to soften the rubber composition by diluting the elastomer and the reinforcing filler.

The content of plasticizing agent in the rubber composition is more than 30 phr (for example, between 30 and 120 phr).

A thirteenth aspect of the invention is the tire according to any one of the first to the twelfth aspects, wherein the content of plasticizing agent is more than 40 phr (for example, between 40 and 110 phr), preferably more than 45 phr (for example, between 45 and 105 phr), more preferably more than 50 phr (for example, between 50 and 100 phr), still more preferably more than 55 phr (for example, between 55 and 95 phr), particularly more than 60 phr (for example, between 60 and 90 phr).

A fourteenth aspect of the invention is the tire according to any one of the first to the thirteenth aspects, wherein the plasticizing agent comprises a liquid plasticizer(s), a hydrocarbon resin(s) or the mixtures thereof, preferably the mixture thereof.

A fifteenth aspect of the invention is the tire according to the fourteenth aspect, wherein the plasticizing agent comprises a liquid plasticizer(s) and a hydrocarbon resin(s).

According to a preferred embodiment of the fourteenth aspect or the fifteenth aspect, the hydrocarbon resin(s) exhibits a glass transition temperature ($Tg_{DSC}$) of above 20° C. (for example between 20° C. and 100° C.), preferably above 30° C. (for example between 30° C. and 100° C.), more preferably above 40° C. (for example between 40° C. and 100° C.).

A sixteenth aspect of the invention is the tire according to the fourteenth aspect or the fifteenth aspect, wherein the content of liquid plasticizer(s) is between 15 and 95 phr, preferably between 20 and 90 phr, more preferably between 25 to 85 phr, still more preferably between 30 and 80 phr, particularly between 35 and 75 phr, more particularly between 40 and 70 phr, still more particularly between 45 and 65 phr.

Any extending oil, whether of aromatic or non-aromatic nature, any liquid plasticizing agent known for its plasticizing properties with regard to elastomer matrix(es), for instance, diene elastomers, can be used as the liquid plasticizer(s) in order to soften the matrix by diluting the elastomer and the reinforcing filler. At ambient temperature (20° C.) under atmospheric pressure, these plasticizers or these oils, which are more or less viscous, are liquids (that is to say, as a reminder, substances that have the ability to eventually take on the shape of their container), as opposed to plasticizing hydrocarbon resin(s) which are by nature solid at ambient temperature (20° C.) under atmospheric pressure.

A seventeenth aspect of the invention is the tire according to any one of the fourteenth to the sixteenth aspects, wherein the liquid plasticizer(s) are selected from the group consisting of liquid diene polymers, polyolefinic oils, naphthenic oils, paraffinic oils, Distillate Aromatic Extracts (DAE) oils, Medium Extracted Solvates (MES) oils, Treated Distillate Aromatic Extracts (TDAE) oils, Residual Aromatic Extracts (RAE) oils, Treated Residual Aromatic Extracts (TRAE) oils, Safety Residual Aromatic Extracts (SRAE) oils, mineral oils, vegetable oils, ether plasticizers, ester plasticizers, phosphate plasticizers, sulphonate plasticizers and the mixtures thereof, preferably selected from the group consisting of MES oils, TDAE oils, naphthenic oils, vegetable oils and the mixtures thereof.

An eighteenth aspect of the invention is the tire according to any one of the fourteenth to the seventeenth aspects, wherein the content of hydrocarbon resin(s) is between 5 and 95 phr, preferably between 10 and 90 phr.

The hydrocarbon resin(s) are polymer well known by a person skilled in the art, which are essentially based on carbon and hydrogen, and thus miscible by nature in rubber composition(s), for instance, diene elastomer composition(s). They can be aliphatic or aromatic or also of the aliphatic/aromatic type, that is to say based on aliphatic and/or aromatic monomers. They can be natural or synthetic and may or may not be petroleum-based (if such is the case, also known under the name of petroleum resins). They are preferably exclusively hydrocarbon, that is to say, that they comprise only carbon and hydrogen atoms.

Preferably, the hydrocarbon resins as being "plasticizing" exhibit at least one, more preferably all, of the following characteristics:

a $Tg_{DSC}$ of above 20° C. (for example between 20° C. and 100° C.), preferably above 30° C. (for example between 30° C. and 100° C.), more preferably above 40° C. (for example between 40° C. and 100° C.);

a number-average molecular weight (Mn) of between 400 and 2000 g/mol (more preferably between 500 and 1500 g/mol);

a polydispersity index (PI) of less than 3, more preferably less than 2 (reminder: PI=Mw/Mn with Mw the weight-average molecular weight).

The macrostructure (Mw, Mn and PI) of the hydrocarbon resins is determined by steric exclusion chromatography (SEC): solvent tetrahydrofuran; temperature 35° C.; concentration 1 g/l; flow rate 1 ml/min; solution filtered through a filter with a porosity of 0.45 μm before injection; Moore calibration with polystyrene standards; set of 3 "Waters" columns in series ("Styragel" HR4E, HR1 and HR0.5); detection by differential refractometer ("Waters 2410") and its associated operating software ("Waters Empower").

A nineteenth aspect of the invention is the tire according to any one of the fourteenth to the eighteenth aspects, wherein the hydrocarbon resins are selected from the group consisting of cyclopentadiene (abbreviated to CPD) homopolymer or copolymer resins, dicyclopentadiene (abbreviated to DCPD) homopolymer or copolymer resins, terpene homopolymer or copolymer resins, $C_5$ fraction homopolymer or copolymer resins, $C_9$ fraction homopolymer or copolymer resins, alpha-methyl styrene homopolymer or copolymer resins and the mixtures thereof. Use is more preferably made, among the above copolymer resins, of those selected from the group consisting of (D)CPD/vinylaromatic copolymer resins, (D)CPD/terpene copolymer resins, (D)CPD/$C_5$ fraction copolymer resins, (D)CPD/$C_9$ fraction copolymer resins, terpene/vinylaromatic copolymer resins, terpene/phenol copolymer resins, $C_5$ fraction/vinyl-aromatic copolymer resins, $C_9$ fraction/vinylaromatic copolymer resins, and the mixtures thereof.

The term "terpene" combines here, in a known way, the α-pinene, β-pinene and limonene monomers; use is preferably made of a limonene monomer, which compound exists, in a known way, in the form of three possible isomers: L-limonene (laevorotatory enantiomer), D-limonene (dextrorotatory enantiomer) or else dipentene, the racemate of the dextrorotatory and laevorotatory enantiomers. Styrene, α-methylstyrene, ortho-, meta- or para-methylstyrene, vinyltoluene, para-(tert-butyl)styrene, methoxystyrenes, chlorostyrenes, hydroxystyrenes, vinylmesitylene, divinylbenzene, vinylnaphthalene, or any vinylaromatic monomer resulting from a $C_9$ fraction (or more generally from a $C_8$ to $C_{10}$ fraction) are suitable, for example, as vinylaromatic monomer. Preferably, the vinylaromatic compound is styrene or a vinylaromatic monomer resulting from a $C_9$ fraction (or more generally from a $C_8$ to $C_{10}$ fraction). Preferably, the vinylaromatic compound is the minor monomer, expressed as molar fraction, in the copolymer under consideration.

The preferred resins above are well known to a person skilled in the art and are commercially available, for example:

polylimonene resins: by DRT under the name "Dercolyte L120" (Mn=625 g/mol; Mw=1010 g/mol; PI=1.6; $Tg_{DSC}$=72° C.) or by Arizona Chemical Company under the name "Sylvagum TR7125C" (Mn=630 g/mol; Mw=950 g/mol; PI=1.5; $Tg_{DSC}$=70° C.);

$C_5$ fraction/vinylaromatic, notably $C_5$ fraction/styrene or $C_5$ fraction/$C_9$ fraction, copolymer resins: by Neville Chemical Company under the names "Super Nevtac 78", "Super Nevtac 85" or "Super Nevtac 99", by Goodyear Chemicals under the name "Wingtack Extra", by Kolon under the names "Hikorez T1095" and "Hikorez T1100", or by Exxon under the names "Escorez 2101" and "ECR 373";

limonene/styrene copolymer resins: by DRT under the name "Dercolyte TS 105" or by Arizona Chemical Company under the names "ZT115LT" and "ZT5100".

Mention may also be made, as examples of other preferred resins, of phenolmodified α-methylstirene resins. It should be remembered that, in order to characterize these phenol-modified resins, use is made, in a known way, of a number referred to as "hydroxyl number" (measured according to Standard ISO 4326 and expressed in mg KOH/g). α-Methylstirene resins, in particular those modified with phenol, are well known to a person skilled in the art and are available commercially, for example sold by Arizona Chemical Company under the names "Sylvares SA 100" (Mn=660 g/mol; PI=1.5; $Tg_{DSC}$=53° C.); "Sylvares SA 120" (Mn=1030 g/mol; PI=1.9; $Tg_{DSC}$=64° C.); "Sylvares 540" (Mn=620 g/mol; PI=1.3; $Tg_{DSC}$=36° C.; hydroxyl number=56 mg KOH/g); and "Sylvares 600" (Mn=850 g/mol; PI=1.4; $Tg_{DSC}$=50° C.; hydroxyl number=31 mg KOH/g).

The rubber composition of the tread of the tire according to the invention is based on more than 5 phr (for example, between 5 and 150 phr) of crumb rubber particles.

Regarding the content of the particles, below the indicated minimum, the targeted technical effect is insufficient. Wherein the indicated maximum, there is a risk of worsening processability and/or wear performance of the tire.

According to a preferred embodiment of the invention, the content of crumb rubber particles is more than 10 phr (for example, between 10 and 100 phr), preferably more than 15 phr (for example, between 15 and 50 phr).

The crumb rubber particles in the rubber composition of the tread of the tire according to the invention have a median particle size by volume, which is measured by laser diffraction methods in accordance with ISO standard 13320-1, which satisfy the following relations:

100 μm<$D_{50}$<1000 μm, wherein $D_{50}$ is the medium particle size by volume corresponding to 50% of a cumulative distribution obtained from the volume particle size distribution, that is to say, particle size by volume, 50% of the crumb rubber particles have smaller diameter(s) than $D_{50}$, and another 50% of the crumb rubber particles have larger diameter(s) than $D_{50}$.

Regarding the $D_{50}$, below the indicated minimum, the targeted technical effect (to improve the grip on snowy ground with an effective roughness by virtue of cavities which the particles release from the rubber composition when the tire of the invention is running and/or the tread of tire is worn) is insufficient. Whereas, above the maximum indicated, there is a risk of considerable aesthetic loss.

According to a preferred embodiment of the invention, the median particle size by volume of the crumb rubber particles ($D_{50}$) is between 200 μm and 900 μm, preferably between 300 μm and 800 μm, more preferably between 400 μm and 700 μm.

A twentieth aspect of the invention is the tire according to any one of the first to the nineteenth aspects, wherein the content of crumb rubber particles is more than 20 phr (for example, between 20 and 40 phr).

A twenty first aspect of the invention is the tire according to any one of the first to the twentieth aspects, wherein: 500 μm<$D_{50}$<600 μm.

A twenty second aspect of the invention is the tire according to any one of the first to the twenty first aspects, wherein the crumb rubber particles have a width of a volume particle size distribution which is measured by laser diffraction methods in accordance with ISO standard 13320-1, which satisfy the following relations:

1.0<Span<1.6, preferably 1.1<Span<1.5;

wherein:

Span=($D_{90}$−$D_{10}$)/$D_{50}$; and $D_{10}$ and $D_{90}$ are the particle size corresponding to 10 volume % and to 90 volume %, respectively, of the cumulative particle distribution.

According to a preferred embodiment of the twenty second aspect, the $D_{10}$ is more than 75 μm, preferably more than 100 μm, more preferably more than 125 μm, still more preferably more than 150 μm.

According to a preferred embodiment of the twenty second aspect, the $D_{90}$ is less than 1025 μm, preferably less than 1000 μm, more preferably less than 975 μm, still more preferably less than 950 μm.

The crumb rubber particles are defined as particles obtained by reducing scrap tire(s) or other rubber(s) into granules with reinforcing materials such as steel(s) or fiber(s) removed along with any other contaminants such as dust(s), glass(es), or rock(s). "Rubber Chemistry and Technology" discloses many methods of grinding vulcanized or crosslinked rubber(s) into crumb rubber particles.

A twenty third aspect of the invention is the tire according to any one of the first to the twenty second aspects, wherein the crumb rubber particles are generated from scrap tires.

A twenty fourth aspect of the invention is the tire according to any one of the first to the twenty third aspects, wherein the crumb rubber particles are mechanically processed, cryogenically processed, or mechanically and cryogenically processed, that is, the crumb rubber particles is ground using a mechanical grinding process, a cryogenic process or the both processes. In both processes, the steel components are removed using a magnetic separator and the fiber components are separated by air classifiers or other separation equipment. The mechanical grinding process uses a variety of grinding techniques, such as cracker mills, granulators, etc. to mechanically break down the rubber into small particles. In the cryogenic process, shredded rubber is frozen at an extremely low temperature then shattered into small particles. Particular embodiments of the present invention use crumb rubber particles produced through a mechanical grinding process. Other embodiments use crumb rubber particles produced using a cryogenic process. Many crumb rubbers are commercially available and for example, a suitable crumb rubber for use in the present invention is available from Global Corporation or Nantong Huili Rubber Corporation.

The rubber compositions of the treads of the tires according to the invention may be based on all or a portion(s) of the usual additives generally used in the elastomer compositions intended for the manufacture of treads for tires, in particular for snow tires or winter tires, such as, for example, protection agents, such as antiozone waxes, chemical antiozonants, antioxidants, reinforcing resins, methylene acceptors (for example phenolic novolak resin) or methylene donors (for example HMT or H3M), a crosslinking system based either on sulphur or on donors of sulphur and/or peroxide and/or bismaleimides, vulcanization accelerators, or vulcanization activators.

These compositions can also be based on coupling activators when a coupling agent is used, agents for covering the reinforcing inorganic filler or more generally processing aids capable, in a known way, by virtue of an improvement in the dispersion of the filler in the rubber matrix and of a lowering of the viscosity of the compositions, of improving their property of processing in the raw state; these agents are, for example, hydrolysable silanes, such as alkylalkoxysilanes, polyols, polyethers, amines, or hydroxylated or hydrolysable polyorganosiloxanes.

The rubber compositions of the treads of the tires according to the invention may be manufactured in appropriate mixers using two successive preparation phases well known to a person skilled in the art: a first phase of thermomechanical working or kneading (referred to as "non-productive" phase) at high temperature, up to a maximum temperature of between 110° C. and 190° C., preferably between 130° C. and 180° C., followed by a second phase of mechanical working (referred to as "productive" phase) at a lower temperature, typically of less than 110° C., for example between 40° C. and 100° C., finishing phase during which the crosslinking or vulcanization system is incorporated.

A process which can be used for the manufacture of such compositions comprises, for example and preferably, the following steps:

incorporating in the elastomer matrix, for instance, the diene elastomer(s), in a mixer, the reinforcing filler, the plasticizing agent, during a first stage ("non productive" stage) everything being kneaded thermomechanically (for example in one or more steps) until a maximum temperature of between 110° C. and 190° C. is reached;

cooling the combined mixture to a temperature of less than 100° C.;

subsequently incorporating, during a second stage (referred to as a "productive" stage), a crosslinking system;

kneading everything up to a maximum temperature of less than 110° C.;

extruding or calendering the rubber composition thus obtained, in particular in the form of a tire tread.

By way of example, the first (non-productive) phase is carried out in a single thermomechanical stage during which all the necessary constituents are introduced into an appropriate mixer, such as a standard internal mixer, followed, in a second step, for example after kneading for 1 to 2 minutes, by the other additives, optional additional filler-covering agents or processing aids, with the exception of the crosslinking system. The total kneading time, in this non-productive phase, is preferably between 1 and 15 min.

After cooling the mixture thus obtained, the crosslinking system is then incorporated at low temperature (for example, between 40° C. and 100° C.), generally in an external mixer, such as an open mill; the combined mixture is then mixed (the second (productive) phase) for a few minutes, for example between 2 and 15 min.

The crosslinking system proper is preferably based on sulphur and on a primary vulcanization accelerator, in particular on an accelerator of sulphenamide type. Added to this vulcanization system are various known secondary accelerators or vulcanization activators, such as zinc oxide, stearic acid, guanidine derivatives (in particular diphenylguanidine), and the like, incorporated during the first non-productive phase and/or during the productive phase. The content of sulphur is preferably between 0.5 and 3.0 phr, and that of the primary accelerator is preferably between 0.5 and 5.0 phr.

Use may be made, as accelerator (primary or secondary) of any compound capable of acting as accelerator of the vulcanization of elastomer matrix, for instance, diene elastomers, in the presence of sulphur, in particular accelerators of the thiazoles type and their derivatives, accelerators of thiurams types, or zinc dithiocarbamates. These accelerators are more preferably selected from the group consisting of 2-mercaptobenzothiazyl disulphide (abbreviated to "MBTS"), N-cyclohexyl-2-benzothiazole sulphenamide (abbreviated to "CBS"), N,N-dicyclohexyl-2 benzothiazolesulphenamide ("DCBS"), N-tert-butyl-2-benzothiazolesulphenamide ("TBBS"), N-tert-butyl-2 benzothiazolesulphenimide ("TBSI"), zinc dibenzyldithiocarbamate ("ZBEC"), Tetrabenzylthiuram disulfide ("TBZTD") and the mixtures thereof.

The final composition thus obtained is subsequently calendered, for example in the form of a sheet or of a plaque, in particular for laboratory characterization, or else extruded in the form of a rubber profiled element which can be used directly as snow tire tread(s) or winter tire tread(s).

The vulcanization (or curing) is carried out in a known way at a temperature generally of between 110° C. and 190° C. for a sufficient time which can vary, for example, between 5 and 90 min depending in particular on the curing temperature, the vulcanization system adopted and the vulcanization kinetics of the composition under consideration.

The rubber compositions of the treads of the tires according to the invention can constitute all or a portion only of the tread of the tire in accordance with the invention, in the case of a tread of composite type formed from several rubber compositions of different formulations.

The invention relates to the rubber compositions and to the treads described above, both in the raw state (i.e., before curing) and in the cured state (i.e., after crosslinking or vulcanization).

The invention also applies to the cases where the rubber compositions described above form only one part of treads of composite or hybrid type, especially those consisting of two radially superposed layers of different formulations (referred to as "cap-base" construction), that are both patterned and intended to come into contact with the road when the tire is rolling, during the service life of the latter. The base part of the formulation described above could then constitute the radially outer layer of the tread intended to come into contact with the ground from the moment when a new tire starts rolling, or on the other hand its radially inner layer intended to come into contact with the ground at a later stage.

A twenty fifth aspect of the invention is the tire according to any one of the first to the twenty fourth aspects, wherein the tire is a snow tire.

A twenty sixth aspect of the invention is a rubber composition based on at least:
- an elastomer matrix;
- a reinforcing filler comprising between 65 and 115 phr of a reinforcing inorganic filler;
- more than 30 phr (for example, between 30 and 120 phr), preferably more than 35 phr (for example, between 35 and 115 phr), of a plasticizing agent; and
- more than 5 phr (for example, between 5 and 150 phr), preferably more than 10 phr (for example, between 10 and 100 phr), more preferably more than 15 phr (for example, between 15 and 50 phr), of crumb rubber particles having a median particle size by volume, which is measured by laser diffraction methods in accordance with ISO standard 13320-1, which satisfy the following relations:
100 µm<$D_{50}$<1000 µm, preferably 200 µm<$D_{50}$<900 µm, more preferably 300 µm<$D_{50}$<800 µm, still more preferably 400 µm<$D_{50}$<700 µm;
wherein $D_{50}$ is the medium particle size by volume corresponding to 50% of a cumulative distribution obtained from the volume particle size distribution.

The invention is further illustrated by the following non-limiting examples.

Examples

In the test, three rubber compositions (identified as C-1 (a reference), C-2 (an example according to the invention), and C-3 (a comparative example)) are compared. The three rubber compositions are based on a diene elastomer (blend of BR and NR) reinforced with a blend of silica (as inorganic filler) and carbon black, and a plasticizing agent with/without crumb rubber particles. The formulations of the three rubber compositions are given at Table 1 with the content of the various products expressed in phr.

Each rubber composition was produced as follows: The reinforcing filler, its associated coupling agent, the plasticizing agent, the particles, the elastomer matrix and the various other ingredients, with the exception of the vulcanization system, were successively introduced into an internal mixer having an initial vessel temperature of approximately 60° C.; the mixer was thus approximately 70% full (% by volume). Thermomechanical working (non-productive phase) was then carried out in one stage, which lasts in total approximately 3 to 4 minutes, until a maximum "dropping" temperature of 165° C. was reached. The mixture thus obtained was recovered and cooled and then sulphur and an accelerator of sulphenamide type were incorporated on an external mixer (homofinisher) at 20 to 30° C., everything being mixed (productive phase) for an appropriate time (for example, between 5 and 12 min).

The rubber compositions thus obtained were subsequently calendered, either in the form of sheets (thickness of 2 to 3 mm) or of fine sheets of rubber, for the measurement of their physical or mechanical properties, or in the form of profiled elements which could be used directly, after cutting and/or assembling to the desired dimensions, for example as tire semi-finished products, in particular as tire treads.

In order to confirm the effect of the present invention, three tires (identified as T-1 (a reference), T-2 (an example according to the invention), and T-3 (a comparative example)) having treads comprising the above rubber compositions are compared.

T-1: Rubber composition C-1;
T-2: Rubber composition C-2;
T-3: Rubber composition C-3.

These tires, for radial carcass passenger vehicle winter tires, having a size of 205/55R16, were conventionally manufactured and in all respects identical apart from the rubber compositions of treads.

All of the tires were fitted to the front and rear axles of motor vehicles, under nominal tire inflation pressure, and were subjected to rolling on a circuit for about 10,000 km in order to reproduce the tires in the worn state.

As snow braking (deceleration) test which can indicate snow grip performance, a 1,400 cc passenger car provided on all the four wheels with the same kind of test tires under 220 kPa of tire inflation pressure mounted onto 6.5J×16 rim was run on a snow covered road at snow temperature of about −6° C., the deceleration from 50 to 5 km/h during sudden longitudinal braking while anti-lock braking system (ABS) activated was measured. The above snow tests were conducted on a hard pack snow with a CTI penetrometer reading of about 87 in according to Standard ASTM F1805.

Moreover, as ice braking test which can indicate snow grip performance, the above passenger car with the above test tires under the above tire inflation pressure mounted onto the above rim was run on an ice covered road at ice temperature of about −2° C., and the braking distance from 20 to 5 km/h during sudden longitudinal braking while anti-lock braking system (ABS) activated was measured.

The results of the snow braking test and the ice braking test are shown in Table 2, in relative units, the base 100 being selected for the reference tire T-1 (it should be remembered that a value of greater than 100 indicates an improved performance).

Furthermore, the tread surfaces of the above worn tires were evaluated visually by 23 general tire consumers who had owned vehicles, had driven the vehicles daily, and had had experience to purchase new tires due to usual wear-out and damaged wear. Each of the consumers assigned a qualitative mark for appearance of each tire tread surface; a mark lower that of one of the reference tires (T-1), arbitrarily set to 100, indicates damaged the tire tread surface. The averaged value of obtained marks from all of the consumers is shown in Table 2.

The results from Table 2 demonstrate that the tire (T-2) according to the invention has an unexpectedly improved totality of the performances of snow grip and ice grip and the appearance of tire tread surface than that of the reference or the comparative example (T-1 and T-3).

Additionally, similarly to the above, the other three tires (identified as T-4 (another reference), T-5 (an example according to the invention) and T-6 (a comparative example)) having treads comprising the other three rubber compositions (C-4 (another reference), C-5 (an example according to the invention) and C-6 (a comparative example), the formulas shown in Table 3) and a size of 205/55R16 were produced, subjected to rolling on the circuit for about 10,000 km, and done the snow braking test and the ice braking test, and the tread surfaces of the worn tires were evaluated visually by the customers.

T-4: Rubber composition C-4;

T-5: Rubber composition C-5;

T-6: Rubber composition C-6.

Similarly to the above results, the results from Table 4 demonstrate that the tire (T-5) according to the invention has an unexpectedly improved totality of the performances of winter grips and the appearance of tire tread surface than that of the reference and the comparative example (T-4 and T-6).

In conclusion, the rubber composition of the treads of the tire according to the invention allows an improvement of the totality of the winter grip performances and the appearance of tire tread surface during the service life of the tire.

TABLE 1

|  | C-1 | C-2 | C-3 |
|---|---|---|---|
| BR (1) | 60 | 60 | 60 |
| NR (2) | 40 | 40 | 40 |
| Carbon black (3) | 5 | 5 | 5 |
| Silica (4) | 90 | 90 | 90 |
| Coupling agent (5) | 7.2 | 7.2 | 7.2 |
| Liquid plasticizer (6) | 55 | 55 | 55 |
| Hydrocarbon resin (7) | 15 | 15 | 15 |
| Particles 1 (8) |  | 25 |  |
| Particles 2 (9) |  |  | 25 |
| ZnO | 1.3 | 1.3 | 1.3 |
| Stearic acid | 1 | 1 | 1 |
| Antiozone wax | 1.5 | 1.5 | 1.5 |
| Antioxidant (10) | 2 | 2 | 2 |
| DPG (11) | 2.1 | 2.1 | 2.1 |
| Sulphur | 2 | 2 | 2 |
| Accelerator (12) | 1.7 | 1.7 | 1.7 |

(1) BR: BR with 0.3% of 1,2 vinyl; 2.7% of trans; 97% of cis-1,4 ($Tg_{DSC}$ = −105° C.);
(2) NR: Natural rubber (peptised);
(3) Carbon black: Carbon black (ASTM grade N234 from Cabot);
(4) Silica: Silica ("Zeosil 1165MP" from Rhodia (CTAB, BET: 160 m²/g));
(5) Coupling agent TESPT ("Si69" from Evonik);
(6) MES oil ("Catenex SNR" from Shell);
(7) Hydrocarbon resin C5/C9 type ("Escorez ECR-373" from Exxon, $Tg_{DSC}$ = 44° C.);
(8) Crumb rubber particles mechanically processed and generated from tread rubbers of scrap tires ($D_{10}$: 154 µm, $D_{50}$: 338 µm, $D_{90}$: 630 µm (measured by laser diffraction methods in accordance with ISO standard 13320-1), Global Co., Ltd);
(9) Crumb rubber particles mechanically processed and generated from tread rubbers of scrap tires ($D_{10}$: 610 µm, $D_{50}$: 1250 µm, $D_{90}$: 2360 µm (measured by laser diffraction methods in accordance with ISO standard 13320-1), Global Co., Ltd);
(10) N-(1,3-dimethylbutyl)-N-phenyl-para-phenylenediamine ("Santoflex 6-PPD" from Flexsys);
(11) Diphenylguanidine ("Perkacit DPG" from Flexsys);
(12) N-dicyclohexyl-2-benzothiazolesulphenamide ("Santocure CBS" from Flexsys).

TABLE 2

|  | T-1 | T-2 | T-3 |
|---|---|---|---|
| Snow braking | 100 | 107 | 104 |
| Ice braking | 100 | 100 | 100 |
| Appearance of tire tread surface | 100 | 100 | 60 |
| Total | 300 | 307 | 264 |

TABLE 3

|  | C-4 | C-5 | C-6 |
|---|---|---|---|
| BR (1) | 60 | 60 | 60 |
| NR (2) | 40 | 40 | 40 |
| Carbon black (3) | 5 | 5 | 5 |
| Silica (4) | 80 | 80 | 80 |
| Coupling agent (5) | 6.4 | 6.4 | 6.4 |
| Liquid plasticizer (6) | 55 | 55 | 15 |
| Hydrocarbon resin (7) | 15 | 15 | 15 |
| Particles 3 (13) |  | 25 | 25 |
| ZnO | 1.3 | 1.3 | 1.3 |
| Stearic acid | 1 | 1 | 1 |
| Antiozone wax | 1.5 | 1.5 | 1.5 |
| Antioxidant (10) | 2 | 2 | 2 |
| DPG (11) | 1.9 | 1.9 | 1.9 |
| Sulphur | 2 | 2 | 2 |
| Accelerator (12) | 1.7 | 1.7 | 1.7 |

(13) Crumb rubber particles mechanically processed and generated from tread rubbers of scrap tires ($D_{10}$: 276 µm, $D_{50}$: 550 µm, $D_{90}$: 930 µm (measured by laser diffraction methods in accordance with ISO standard 13320-1), Nantong Huili Rubber Co., Ltd);

TABLE 4

|  | T-4 | T-5 | T-6 |
|---|---|---|---|
| Snow braking | 100 | 108 | 85 |
| Ice braking | 100 | 104 | 87 |
| Appearance of tire tread surface | 100 | 100 | 100 |
| Total | 300 | 308 | 272 |

The invention claimed is:

1. A tire having a tread comprising a rubber composition based on at least:
   an elastomer matrix;
   a reinforcing filler comprising between 65 and 115 phr of a reinforcing inorganic filler;
   more than 30 phr of a plasticizing agent; and
   more than 5 phr of crumb rubber particles having a median particle size by volume, which is measured by laser diffraction methods in accordance with ISO standard 13320-1, which satisfy the following relations:

100 µm<$D_{50}$<1000 µm, wherein $D_{50}$ is the median particle size by volume corresponding to 50% of a cumulative distribution obtained from a volume particle size distribution.

2. The tire according to claim 1, wherein the elastomer matrix comprises at least a diene elastomer selected from the group consisting of polybutadienes, polyisoprenes, butadiene copolymers, isoprene copolymers, and mixtures thereof.

3. The tire according to claim 2, wherein the elastomer matrix comprises a first diene elastomer which is a polybutadiene and a second diene elastomer which is a polyisoprene.

4. The tire according to claim 3, wherein the second diene elastomer predominately comprises natural rubber.

5. The tire according to claim 4, wherein the second diene elastomer is natural rubber.

6. The tire according to claim 3, wherein a content of the first diene elastomer is 25 to 75 phr and a content of the second diene elastomer is 25 to 75 phr.

7. The tire according to claim 3, wherein a total content of the first diene elastomer and the second elastomer is more than 90 phr.

8. The tire according to claim 1, wherein the reinforcing inorganic filler predominately comprises silica.

9. The tire according to claim 8, wherein the reinforcing inorganic filler is silica.

10. The tire according to claim 1, wherein the reinforcing filler further comprises less than 20 phr of carbon black.

11. The tire according to claim 1, wherein the plasticizing agent comprises a liquid plasticizer, a hydrocarbon resin or a mixture thereof.

12. The tire according to claim 11, wherein a content of the liquid plasticizer is between 15 and 95 phr.

13. The tire according to claim 11, wherein the liquid plasticizer is selected from the group consisting of liquid diene polymers, polyolefinic oils, naphthenic oils, paraffinic oils, Distillate Aromatic Extracts (DAE) oils, Medium Extracted Solvates (IVIES) oils, Treated Distillate Aromatic Extracts (TDAE) oils, Residual Aromatic Extracts (RAE) oils, Treated Residual Aromatic Extracts (TRAE) oils, Safety Residual Aromatic Extracts (SRAE) oils, mineral oils, vegetable oils, ether plasticizers, ester plasticizers, phosphate plasticizers, sulphonate plasticizers and mixtures thereof.

14. The tire according to claim 11, wherein a content of the hydrocarbon resin is between 5 and 95 phr.

15. The tire according to claim 11, wherein the hydrocarbon resin is selected from the group consisting of cyclopentadiene homopolymer or copolymer resins, dicyclopentadiene homopolymer or copolymer resins, terpene homopolymer or copolymer resins, C5 fraction homopolymer or copolymer resins, C9 fraction homopolymer or copolymer resins, alpha-methyl styrene homopolymer or copolymer resins, and mixtures thereof.

16. The tire according to claim 1, wherein the crumb rubber particles have a width of a volume particle size distribution which is measured by laser diffraction methods in accordance with ISO standard 13320-1, which satisfy the following relations:

$$1.0 < \text{Span} < 1.6,$$

wherein:

$$\text{Span} = (D_{90} - D_{10})/D_{50}; \text{ and}$$

$D_{10}$ and $D_{90}$ are the particle size corresponding to 10 volume % and to 90 volume %, respectively, of the cumulative particle distribution.

17. The tire according to claim 1, wherein the crumb rubber particles are generated from scrap tires.

18. The tire according to claim 1, wherein the crumb rubber particles are mechanically processed, cryogenically processed, or mechanically and cryogenically processed.

19. The tire according to claim 1, wherein the tire is a snow tire.

20. A rubber composition based on at least:
an elastomer matrix;
a reinforcing filler comprising between 65 and 115 phr of a reinforcing inorganic filler;
more than 30 phr of a plasticizing agent; and
more than 5 phr of crumb rubber particles having a median particle size by volume, which is measured by laser diffraction methods in accordance with ISO standard 13320-1, which satisfy the following relations:

$$100 \ \mu m < D_{50} < 1000 \ \mu m;$$

wherein $D_{50}$ is the median particle size by volume corresponding to 50% of a cumulative distribution obtained from a volume particle size distribution.

\* \* \* \* \*